United States Patent
Dong et al.

(10) Patent No.: US 11,977,737 B2
(45) Date of Patent: May 7, 2024

(54) TECHNIQUES TO IMPROVE LATENCY FOR GAMING APPLICATIONS

(71) Applicant: Micron Technology, Inc., Boise, ID (US)

(72) Inventors: Qi Dong, Shanghai (CN); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 31 days.

(21) Appl. No.: 17/652,050

(22) Filed: Feb. 22, 2022

(65) Prior Publication Data

US 2023/0266880 A1 Aug. 24, 2023

(51) Int. Cl.
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC .... G06F 3/0611; G06F 3/0659; G06F 3/0679; G06F 2212/7206
See application file for complete search history.

(56) References Cited

U.S. PATENT DOCUMENTS

| | | | | |
|---|---|---|---|---|
| 7,769,725 | B2 * | 8/2010 | Coca | G06F 12/023 |
| | | | | 707/693 |
| 2012/0159090 | A1 * | 6/2012 | Andrews | G06T 1/20 |
| | | | | 711/E12.001 |
| 2014/0372678 | A1 * | 12/2014 | Moon | G06F 12/0246 |
| | | | | 711/103 |
| 2017/0092366 | A1 * | 3/2017 | Hwang | G06F 3/0616 |
| 2019/0095116 | A1 * | 3/2019 | Igahara | G06F 3/0634 |
| 2019/0265888 | A1 * | 8/2019 | Yang | G11C 11/5671 |

\* cited by examiner

*Primary Examiner* — Kalpit Parikh
(74) *Attorney, Agent, or Firm* — Holland & Hart LLP

(57) ABSTRACT

Methods, systems, and devices for techniques to improve latency for gaming applications are described. The memory system may be configured to operate in a gaming mode that may enable faster load times. In some cases, the gaming mode may enable faster game download from an external server. In some cases, the gaming mode may enable faster transferring of files between volatile storage and non-volatile storage at the memory system. The gaming mode may enable faster read and write operations, and faster switching between one or more gaming applications. The memory system may additionally or alternatively be configured to operate in a non-gaming mode which may improve reliability and retention for other, non-gaming applications. The memory system may switch between the two modes depending on an application being executed by the system.

15 Claims, 9 Drawing Sheets

TECHNIQUES TO IMPROVE LATENCY FOR GAMING APPLICATIONS

FIELD OF TECHNOLOGY

The following relates to one or more systems for memory, including techniques to improve latency for gaming applications.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
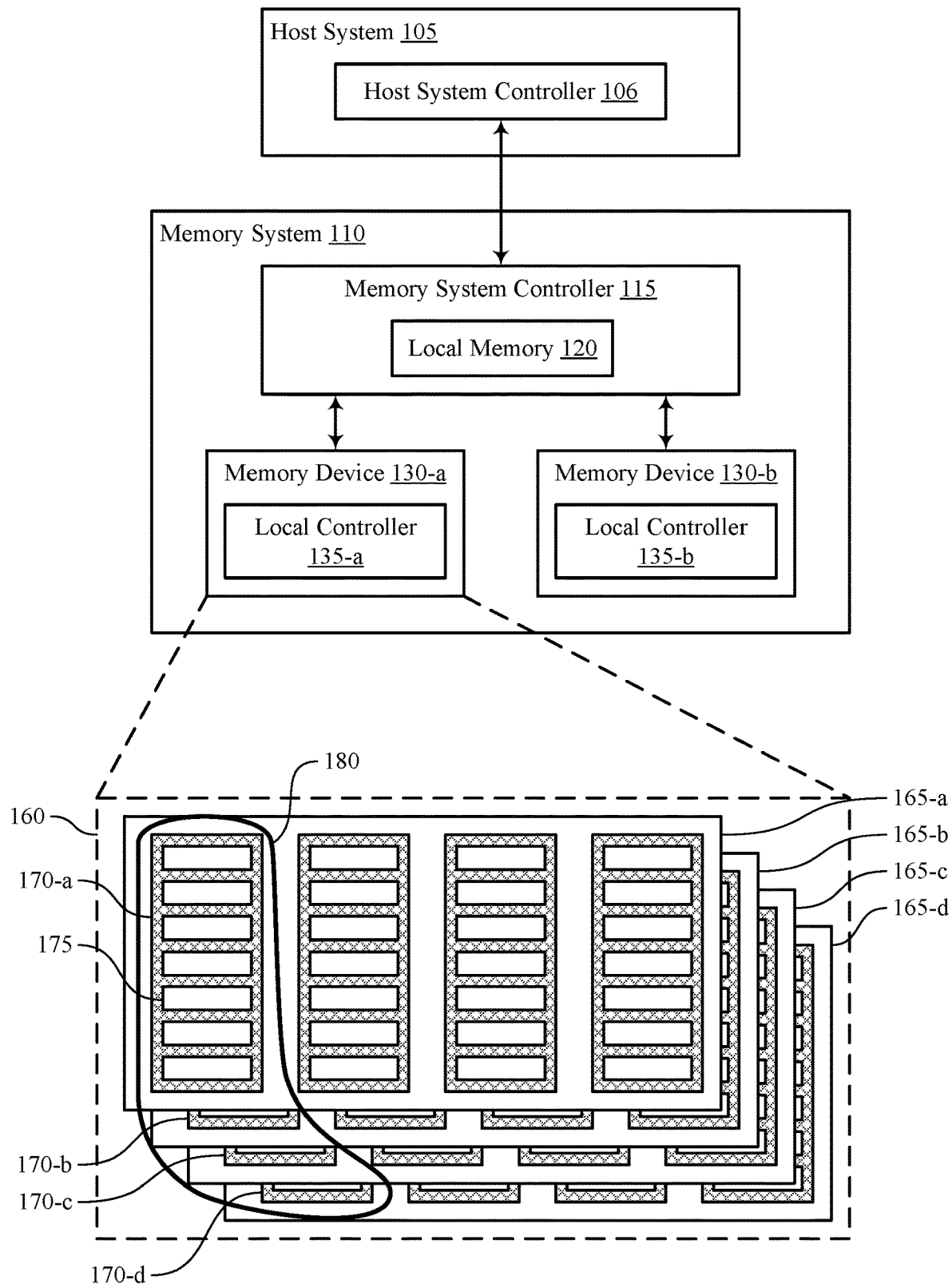
FIG. 1 illustrates an example of a system that supports techniques to improve latency for gaming applications in accordance with examples as disclosed herein.

Electronic devices (e.g., smartphones, laptops, gaming devices) may include host systems and memory systems that together aid in one or more applications performed by the electronic device. In some cases, electronic devices may be used for video game applications, which may involve fast loading of large quantities of data. For example, virtual reality games and other types of games may implement fast rendering of detailed environments based on real-time user inputs. As the standard for game graphics advances, users may expect higher quality images in games, which may additionally increase the amount of data associated with loading game environments. In some cases, users may switch between playing multiple games on one electronic device, which may involve switching between accessing data at one or more locations. In some cases, a user may experience reduced playability (e.g., reduced user satisfaction) due to an electronic device's latency associated with transferring, uploading, or downloading large quantities of data.

Accordingly, the techniques described herein enable techniques to improve latency for gaming applications. For example, the memory system may be configured to operate in a gaming mode that may enable faster load times. In some cases, the gaming mode may enable faster game download from an external server (e.g., cloud) to non-volatile storage of the memory system. In some cases, the gaming mode may enable faster loading of a game by enabling faster transferring of files from a non-volatile storage to a volatile storage (e.g., from NAND to RAM) at the memory system. In some cases, the gaming mode may enable faster switching between games by enabling faster transferring of files from the volatile storage to the non-volatile storage (e.g., from RAM to NAND), in addition to faster transferring from the non-volatile storage to the volatile storage. The gaming mode may therefore enable faster read and write operations at the non-volatile storage of the memory system, and faster switching between one or more gaming applications. The memory system may additionally or alternatively be configured to operate in a non-gaming mode (e.g., a standard mode) which may improve reliability and retention for other applications. The memory system may switch between the two modes depending on the present application of the electronic device. By switching the mode, the memory system (e.g., the non-volatile storage of the memory system) may use a quad-level cell (QLC) or octa-level cell (OLC) memory system while also maintaining compatibility for performing gaming applications.

Features of the disclosure are initially described in the context of systems, devices, and circuits with reference to FIGS. 1 through 4. Features of the disclosure are described in the context of a process flow with reference to FIG. 5. These and other features of the disclosure are further illustrated by and described in the context of an apparatus diagram and flowchart that relate to techniques to improve latency for gaming applications with reference to FIGS. 6-9.

FIG. 1 illustrates an example of a system 100 that supports techniques to improve latency for gaming applications in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support techniques to improve latency for gaming applications. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, the memory system 110 and the host system 105 may be components of a system that may be used for one or more gaming applications. For example, the system may be an electronic device that may download game applications from a remote server. To reduce latency while the gaming applications are running, the memory system 110 and the host system 105 may switch into a gaming mode, which may be characterized by performing fast access operations at a dedicated portion of memory. For example, in some cases the host system 105 may allocate one or more memory devices 130-a (or a portion of a memory device 130-a) as a dedicated portion of memory for operating in the gaming mode. In some cases, the memory system 110 and the host system 105 may determine not to switch to the gaming mode, and may instead operate in a standard mode, which may be characterized by longer access operations involving a reliability check. By switching between the two modes, the system may enable reduced latency for gaming applications, while also being configured for non-gaming applications.

Figure 2:
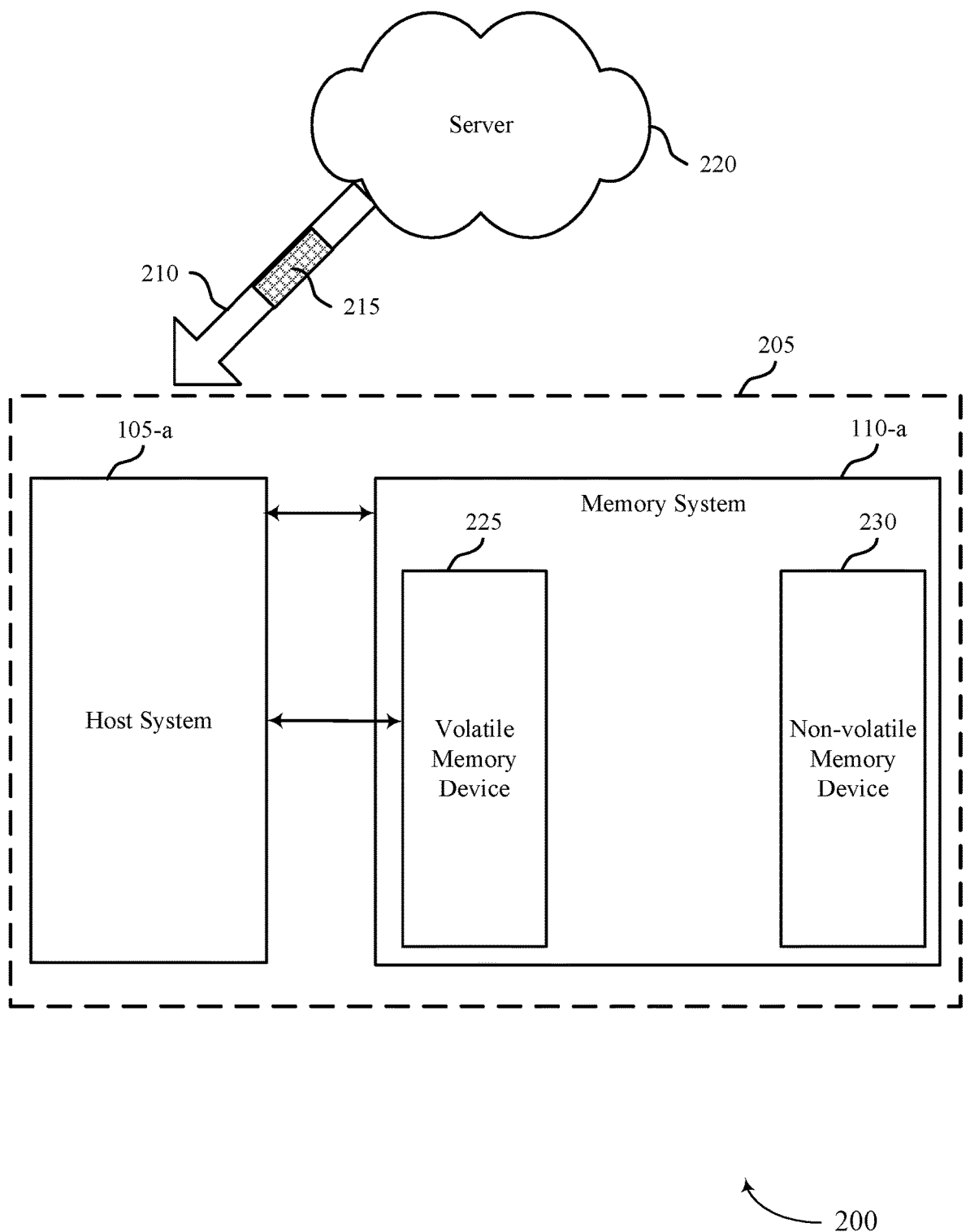
FIG. 2 illustrates an example of a diagram that supports techniques to improve latency for gaming applications in accordance with examples as disclosed herein.

FIG. 2 illustrates an example of a diagram 200 that supports techniques to improve latency for gaming applications in accordance with examples as disclosed herein. The diagram 200 may include a server 220, and a system 205. The system 205 may further include aspects of a memory system as described with reference to FIG. 1. For example, the system 205 may include the host system 105-a, a memory system 110-a, and a volatile memory device 225 (e.g., a portion of SRAM, DRAM). The host system 105-a may be an example of a host system 105 as described with reference to FIG. 1 The memory system 110-a may include a non-volatile memory device 230 and may be an example of a memory system 110 as described with reference to FIG. 1. The non-volatile memory device 230 may be an example of the memory device 130-a described with reference to FIG. 1. In some cases, the volatile memory device 225 may be part of the memory system 110-a and may be accessible using the same controllers (e.g., memory system controller 115) as the non-volatile memory device 230. In such examples, the volatile memory device 225 may be an example of local memory 120 or memory device 130-b or both described with reference to FIG. 1. In some cases, the volatile memory device 225 may be separate from the memory system 110-a and may be independently accessible by the host system 105-a. The diagram 200 may further include a communication link 210 between the server 220 and the system 205, which may be used to communicate one or more game files 215.

In some examples, gaming systems, such as the system 205, may experience increased lag due to downloading game files from an external storage device (e.g., a server 220). For example, in some cases, a user may wish to begin playing a game application shortly after purchasing it or otherwise obtaining it from the server 220. In such cases, the user may start the game application before the download is fully complete, which may cause lag or other errors that may negatively impact the user experience. In some cases, an event in a game may trigger a download of new information from the server, which similarly may introduce lag or other errors.

To reduce latency associated with downloading data from a server, the system 205 may be configured to determine an application (e.g., a gaming application) and switch into a gaming mode based on the application. In some cases, the system 205 may determine the application based on an access command, or a history of access commands, sent from the host system 105-a to the memory system 110-a and/or the volatile memory device 225. For example, an access command may include an indication of the application. In some cases, the system 205 may determine the application based on performing a pattern recognition algorithm. For example, the pattern recognition algorithm may enable the system 205 to assess a history of access commands or data transfers, and determine that they are associated with a gaming application without a direct indication. In some cases, the system 205 may determine the application based on a location in memory associated with the access command. For example, the non-volatile memory device 230 or a portion of the non-volatile memory device 230 may be dedicated for a gaming application, and thus any access commands associated with the dedicated portion of memory may inherently indicate a gaming application. In some cases, the system 205 may determine the application based on a size of the files 215 associated with the access command. For example, the gaming application may have a standard file size, which may be known to the system 205.

The gaming mode may enable faster storing of the files 215 (e.g., compared to a standard mode) downloaded via the communication link 210. In some cases, the communication link 210 may be an example of a wired connection or wireless connection. For example, the server 220 may be an external storage device, cloud storage, or another type of storage. The gaming mode may enable faster read and write operations at the memory system 110-a, as compared with the standard mode. The standard mode may prioritize reliability and retention. For example, the gaming mode may enable the system 205 to write information from the server 220 into local memory (e.g., the volatile memory device 225, a non-volatile memory device 230, or both) with increased speed.

In some cases, the gaming mode may include performing defragmentation operations at the memory system 110-a as part of background operations. For example, the memory system 110-a may regularly perform defragmentation to ensure that a contiguous portion of memory at the non-volatile memory device 230 may be available to write the files 215 after they are downloaded. Read operations and write operations of a set of sequentially-indexed addresses may be faster than read operations and write operations of a set of randomly-indexed addresses.

In some cases, the gaming mode may include performing a write operation using quick placement techniques. In some memory systems, as the quantity of bits stored by a single cell increases, longer durations for applying voltages and checks may be used to ensure that the state stored by the memory cell is accurate. The gaming mode may reduce durations for applying voltages and/or other checks to write the data faster. Background operations may then be used later to improve the quality and reliability of the stored data. Such operations may decrease a latency of a download experienced by a user.

In some cases, the files 215 may be transmitted from the server 220 to the system 205. For example, in some cases, the memory system 110-a may initiate the transfer of the files 215 in response to an access command from the host system 105-a. The host system 105-a may allocate a portion of memory for operating in the gaming mode. In some cases, the system 205 may temporarily store the received files 215 at the volatile memory device 225 before permanently transferring the files 215 to the non-volatile memory device 230. In some cases, the files 215 may be directly transferred from the server 220 to the non-volatile memory device 230 (e.g., the allocated portion of memory for the gaming mode). The memory system 110-a may be an example of a solid state drive (SSD), embedded multimedia card (eMMC), universal flash storage (UFS), or another type of device. By switching into the gaming mode and using memory allocated for the gaming mode, the system 205 may reduce latency and improve user experience.

Figure 3:
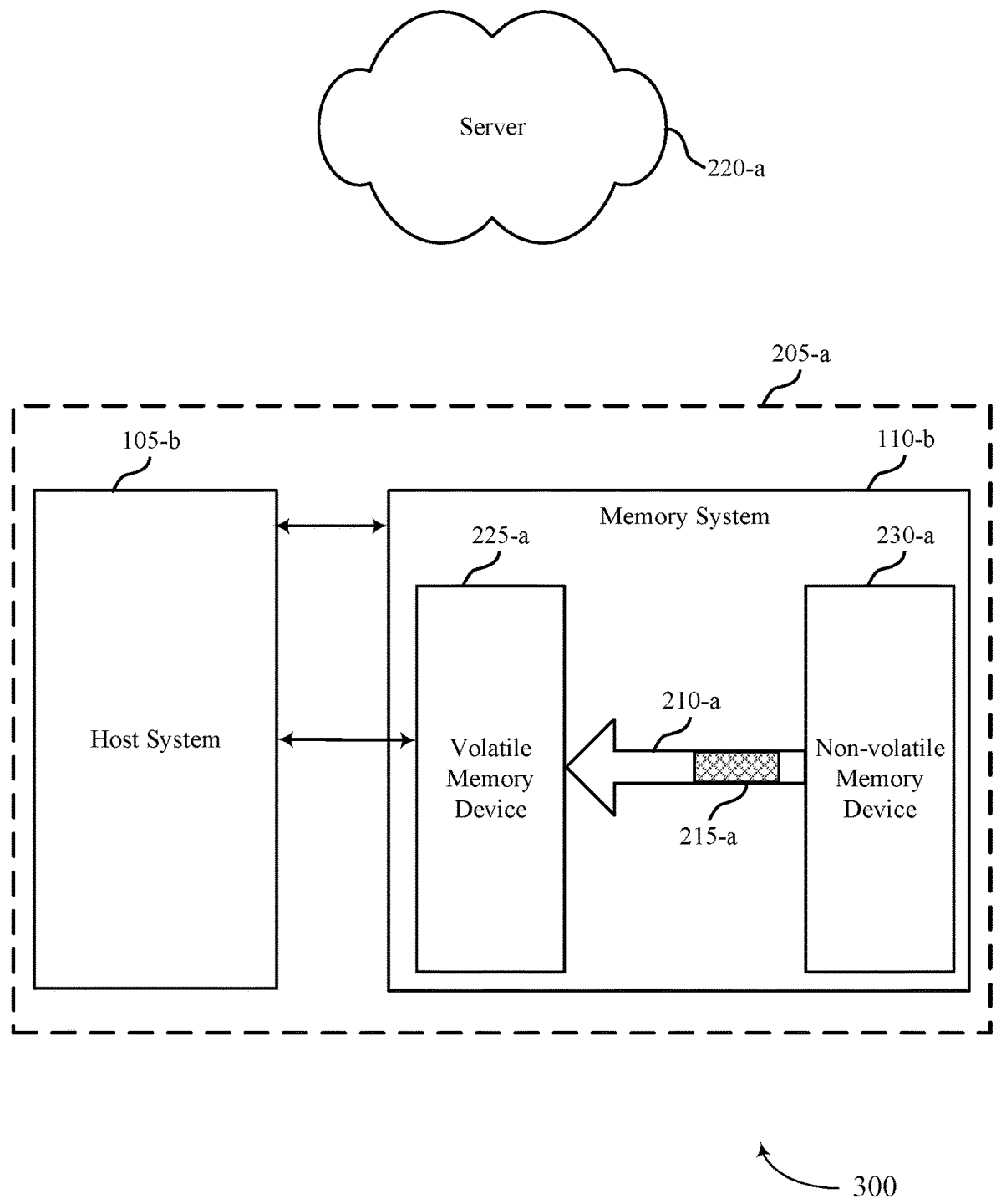
FIG. 3 illustrates an example of a diagram that supports techniques to improve latency for gaming applications in accordance with examples as disclosed herein.

FIG. 3 illustrates an example of a diagram 300 that supports techniques to improve latency for gaming applications in accordance with examples as disclosed herein. The diagram 300 may include a server 220-a, and a system 205-a, which may be examples of the server 220 and the system 205 described with reference to FIG. 2. The system 205-a may further include aspects of a memory system as described with reference to FIG. 1. For example, the system 205-a may include the host system 105-b, a memory system 110-b, and a volatile memory device 225-a (e.g., a portion of SRAM, DRAM). The host system 105-b may be an example of a host system 105 as described with reference to FIGS. 1 and 2. The memory system 110-b may include a non-volatile memory device 230-a may be an example of a memory system 110 as described with reference to FIGS. 1 and 2. The non-volatile memory device 230-a may be an example of the memory device 130-a or non-volatile memory device 230 described with reference to FIGS. 1 and 2. In some cases, the volatile memory device 225-a may be part of the memory system 110-b and may be accessible using the same controllers (e.g., memory system controller 115) as the non-volatile memory device 230-a. In such examples, the volatile memory device 225-a may be an example of local memory 120 or memory device 130-b or both described with reference to FIG. 1. In some cases, the volatile memory device 225-a may be separate from the memory system 110-b and may be independently accessible by the host system 105-b. The diagram 300 may further include a communication link 210-a, which may be an example of a communication link 210 as described with reference to FIG. 2, and which may be used to communicate one or more game files 215-a, which may be an example of game files 215 as described with reference to FIG. 2.

In some examples, gaming systems, such as the system 205-a, may experience increased lag due to transferring game files 215-a from non-volatile storage (e.g., at the non-volatile memory device 230-a) to volatile storage (e.g., at the volatile memory device 225-a). For example, a user may request to play a game at the system 205-a. After the request, at least some of the game files may be transferred from the non-volatile storage to the volatile storage for execution and gameplay. After a game has been downloaded from a server, as described in FIG. 2, the game files 215-a may be stored at an allocated portion of non-volatile memory at the non-volatile memory device 230-a. When the gaming application is in use, a portion of the game files 215-*a* may be transferred into volatile memory device 225-*a* at the host system 105-*b*. In some cases, a player may trigger a condition within the gaming application that may involve an additional data transfer from the non-volatile memory device 230-*a* to the volatile memory device 225-*a* to maintain congruent and cohesive gameplay (e.g., entering a new environment). In some cases, a game may use a "loading screen" to pause while information is being transferred or processed. But, loading time may reduce player satisfaction by imposing a wait in the middle of the game. In the case of virtual reality (VR), for example, it may be further detrimental to the simulated reality to have such loading periods.

To reduce latency associated with transferring data from the non-volatile memory device 230-*a* to the volatile memory device 225-*a* when the gaming application is actively being used, the system 205-*a* may be configured to determine an application and switch into the gaming mode based on the application, as described with reference to FIG. 2. The gaming mode may enable faster transferring of the files 215-*a* via the communication link 210 between the non-volatile memory device 230-*a* and the volatile memory device 225-*a*. For example, the gaming mode may enable the host system 105-*b* to write information from the non-volatile memory device 230-*a* into local memory (e.g., the volatile memory device 225-*a*) with increased speed. The increased speed may be accomplished by writing the game file initially to the non-volatile memory device 230-*a* in a set of sequentially-indexed addresses (or multiple sets). Read operations of sequentially-indexed addresses may take less time than read operations of randomly-indexed addresses. In some cases, the host system 105-*a* may initiate the transfer of the files 215 by transmitting an access command to the memory system 110-*a*. In some cases, the access command may include an indication of the gaming mode. In some cases, the access command may include an indication of the portion of memory allocated for the gaming mode. In some cases, the access command may include an indication of the game file size.

Figure 4:
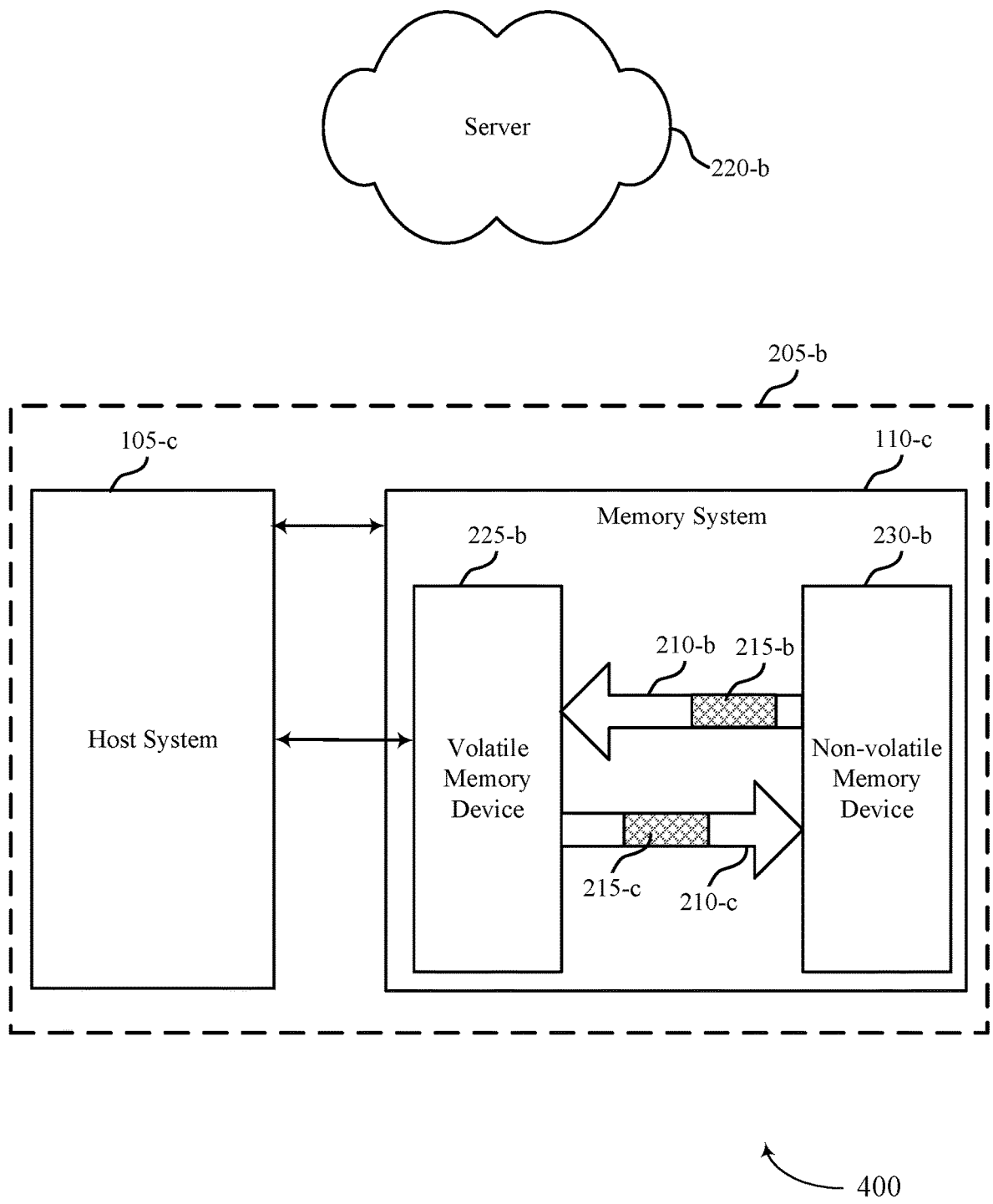
FIG. 4 illustrates an example of a diagram that supports techniques to improve latency for gaming applications in accordance with examples as disclosed herein.

FIG. 4 illustrates an example of a diagram 400 that supports techniques to improve latency for gaming applications in accordance with examples as disclosed herein. The diagram 400 may include a server 220-*b*, and a system 205-*b*, which may be examples of servers 220 and systems 205 as described with reference to FIGS. 2 and 3. The system 205-*b* may further include aspects of a memory system as described with reference to FIG. 1. For example, the system 205-*b* may include the host system 105-*c*, a memory system 110-*c*, and a volatile memory device 225-*b* (e.g., a portion of SRAM, DRAM). The host system 105-*c* may be an example of a host system 105 as described with reference to FIGS. 1-3. The memory system 110-*c* may include a non-volatile memory device 230-*b* may be an example of a memory system 110 as described with reference to FIGS. 1-3. The non-volatile memory device 230-*b* may be an example of the memory device 130-*a* or non-volatile memory devices 230 described with reference to FIGS. 1-3. In some cases, the volatile memory device 225-*b* may be part of the memory system 110-*c* and may be accessible using the same controllers (e.g., memory system controller 115) as the non-volatile memory device 230-*b*. In such examples, the volatile memory device 225-*b* may be an example of local memory 120 or memory device 130-*b* or both described with reference to FIG. 1. In some cases, the volatile memory device 225-*b* may be separate from the memory system 110-*c* and may be independently accessible by the host system 105-*c*. The diagram 400 may further include the communication links 210-*b* and 210-*c*, which may be examples of a communication link 210 as described with reference to FIGS. 2 and 3, and which may be used to communicate one or more game files 215-*b* and 215-*c*, which may be examples of game files 215 as described with reference to FIGS. 2-3.

In some examples, gaming systems, such as the system 205-*b*, may experience increased lag due to transferring game files 215-*b* from non-volatile storage (e.g., at the non-volatile memory device 230-*b*) to volatile storage (e.g., at the volatile memory device 225-*b*) and vice versa. For example, in some cases, the system 205-*b* may be used for multiple gaming applications, which may each be stored by the system 205-*b*. In some cases, the non-volatile memory device 230-*b* may store the game files 215 associated with one or more gaming applications. When a first gaming application is active (e.g., currently being operated by a user), a portion of the game files 215-*c* associated with that gaming application may be transferred to the volatile memory device 225-*b* as described with reference to FIG. 3. In some cases, the user may wish to quickly switch from the first gaming application to a second gaming application, which may involve both transferring game files 215-*c* associated with the first gaming application back to the non-volatile memory device 230-*b*, and transferring game files 215-*b* associated with the second gaming application to the volatile memory device 225-*b*. Both transfers (e.g., via the communication links 210-*b* and 210-*c*) may introduce additional latency, which may be detrimental to the user experience.

To reduce latency associated with transferring data back and forth between the non-volatile memory device 230-*b* and the volatile memory device 225-*b*, the system 205-*b* may be configured to determine an application and switch into the gaming mode based on the application, as described with reference to FIGS. 2 and 3. The gaming mode may enable faster transferring of the files 215-*b* and 215-*c* via the communication links 210-*b* and 210-*c* between the non-volatile memory device 230-*b* and the volatile memory device 225-*b*, as described with reference to FIG. 3. In some examples, the increased speed may be accomplished by writing the game file initially to the non-volatile memory device 230-*b* in a set of sequentially-indexed addresses (or multiple sets). Read operations of sequentially-indexed addresses of the non-volatile memory device 230-*b* may take less time than read operations of randomly-indexed addresses. Thus, transferring game files 215-*b* from the non-volatile memory device 230-*b* to the volatile memory device 225-*b* may be faster.

In some examples, the transfer of the game files 215-*c* from the volatile memory device 225-*b* to the non-volatile memory device 230-*b* may have increased speed (e.g., reduced latency). In some cases, the memory system 110-*c* may ensure that there are sets of sequentially-indexed addresses to store the game files 215-*c* because storing data in sequentially-indexed addresses of the non-volatile memory device 230-*b* may take less time than storing in randomly-indexed addresses of the non-volatile memory device 230-*b*. Additionally or alternatively, the memory system 110-*c* may use write operations that use quick placement techniques to store the game files 215-*c* in the non-volatile memory device 230-*b*. Thus, transferring game files 215-*c* from volatile memory device 225-*b* to the non-volatile memory device 230-*b* may be faster.

Figure 5:
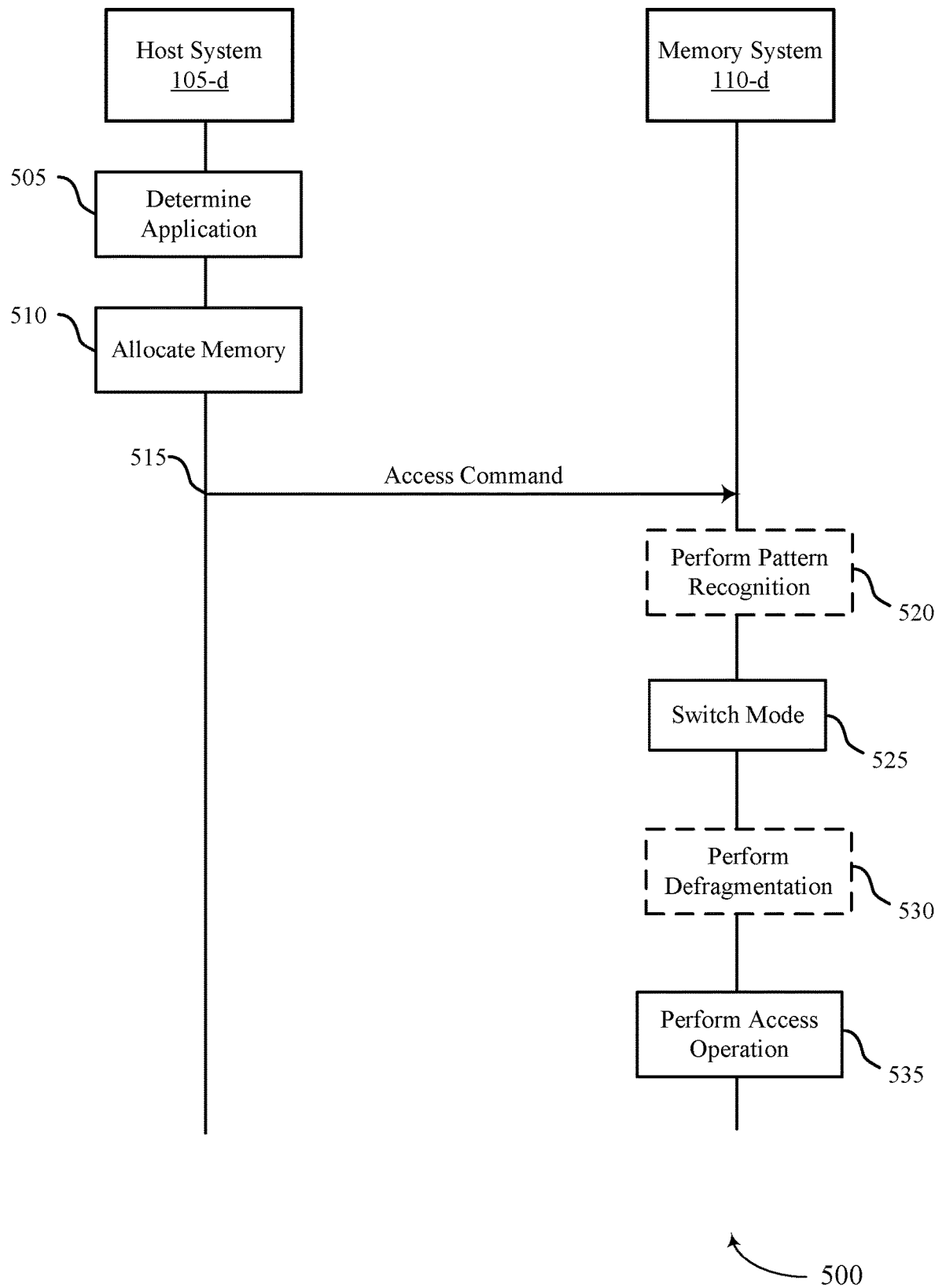
FIG. 5 illustrates an example of a process flow that supports techniques to improve latency for gaming applications in accordance with examples as disclosed herein.

FIG. 5 illustrates an example of a process flow 500 that supports techniques to improve latency for gaming applications in accordance with examples as disclosed herein. Process flow 500 may be implemented by one or more components of a memory system as described with reference to FIGS. 1-4. For example, aspects of the process flow 500 may be performed by or between a host system 105-d and a memory system 110-d.

At 505, the host system 105-d may determine an application presently using the host system 105-d. For example, both the host system 105-d and the memory system 110-d may be components of a gaming system, as described with reference to FIGS. 2-4, which may perform actions associated with one or more gaming applications. The host system 105-d may determine the application by interpreting user inputs at the gaming system, or based on commands received from other components of the gaming system. For example, if a user selects a new game application, the host system 105-d may determine the application based on the user selection.

At 510, the host system 105-d may allocate a portion of memory for access operations associated with the determined application. In some cases, after determining the application, the host system 105-d may determine to operate in a gaming mode. The gaming mode may be characterized in part by a dedicated portion of memory being used to store and access files associated with the gaming application, as described in FIGS. 2-4. The host system 105-d may allocate a portion of non-volatile memory (e.g., at a memory device of the memory system 110-d), such as NAND memory. In some cases, the host system 105-d may additionally or alternatively allocate a portion of volatile memory at the host system 105-d. In some cases, the allocated portions of memory may operate in the gaming mode. By allocating a continue set of addresses for gaming applications, a likelihood of sequential read operations or sequential write operations occurring may be greater. In some memory devices (e.g., NAND memory devices) operations of sequentially-indexed addresses may take less time than operations of randomly-indexed addresses.

At 515, the host system 105-d may transmit an access command to the memory system 110-d. For example, the access command may be associated with the determined gaming application, and may include an indication of the allocated memory. In some cases, the access command may be a read or write command. In some cases, the access command may include an indication to operate in a gaming mode (e.g., a first mode). In some cases, the access command may include an indication of a file size associated with the command. In some cases, the access command may include an indication to perform a defragmentation operation at the allocated portion of the memory system 110-d to ensure a set of sequentially-indexed addresses for the gaming application. In some cases, the access command may initiate a transfer of files between a remote server and the gaming system, as described with reference to FIG. 2. In some cases, the access command may initiate a transfer of files from a non-volatile memory device at the memory system 110-d to a portion of volatile memory at the host system 105-d as described with reference to FIG. 3. In some cases, the access command may initiate a transfer of files from a non-volatile memory device at the memory system 110-d to a portion of volatile memory at the host system 105-d and vice versa, as described with reference to FIG. 4.

In some examples, at 520, the memory system 110-d may perform a pattern recognition algorithm to determine an application or an operating mode. For example, in cases when the access command does not include a direct indication of the gaming application, the memory system 110-d may use pattern recognition to identify that an application being performed by the host system 105-d may be the gaming application. In some cases, the memory system 110-d may detect a pattern based on a history of access commands associated with the gaming application.

At 525, the memory system 110-d may switch from operating in a standard mode (e.g., a second mode) to operating in a gaming mode (e.g., a first mode). In some cases, the memory system 110-d may switch modes based on an indication in the access command received at 515. In some cases, the memory system 110-d may switch modes based on determining that the host system 105-d is operating in the gaming mode by performing the pattern recognition algorithm at 520. In some cases, the memory system 110-d may switch modes based on a file size associated with the access commands. In some cases, the gaming mode may be associated with a first duration for performing the access command (e.g., a shorter duration) and performing a quick cell placement. In some cases, the standard mode may be associated with a second duration (e.g., a longer duration) and may also involve performing an accuracy check after each access command.

In some examples, at 530, the memory system 110-d may perform a defragmentation operation. In some cases, the memory system 110-d may perform the defragmentation after receiving a command to do so (e.g., as part of the access command at 515). In some cases, the memory system 110-d may perform the defragmentation after receiving an indication of a file size associated with the gaming system. For example, the memory system 110-d may perform defragmentation (e.g., deletion or transferal of outdated data at one or more memory devices of the memory system 110-d) to clear a contiguous amount of memory, such that it is available for the new access operation. For example, defragmentation may increase a sequentiality of address space available in the portion of memory allocated for gaming applications. In some cases, the memory system 110-d may perform defragmentation periodically as a background operation. For example, when the memory system 110-d operates in the gaming mode, it may refrain from performing accuracy checks in the interest of prioritizing speed. To reduce latency while also reducing errors, the memory system 110-d may maintain the organization of memory devices by performing regular (e.g., periodic) defragmentation operations to aid in performing quick cell placement write operations.

At 535, the memory system 110-d may perform the access operation. For example, the access operation may be performed in response to receiving the access command at 515. In some cases, the access operation may be performed according to the gaming mode. For example, if the access command is a write command, the memory system 110-d may use quick cell placement to perform the write with reduced latency at the allocated portion of memory. Such examples may reduce the latency of the write operation, as compared with other write operations. For example, the memory system 110-d may perform the write command without performing any checks (e.g., compromising on reliability and retention characteristics), and may perform background operations (e.g., defragmentation) at a later point to make up for the lapse in checking reliability. For example, the increased speed may be accomplished by writing the game file initially to the non-volatile memory device of the memory system 110-d in a set of sequentially-indexed addresses (or in multiple sets). In some cases, if the memory system 110-d determines that the application is not a gaming application, the memory system 110-d may perform the access operation in a standard mode. In such cases, the memory system 110-d may prioritize reliability checks and may perform the access operation more slowly. In cases when the memory system 110-*d* performs access operations in the gaming mode, it may be able to offer high read and write performance.

In some cases, the steps 505 through 535 may be performed for each access operation associated with the gaming application. For example, the host system 105-*d* and the memory system 110-*d* may continually assess whether an application is a gaming application, and therefore whether to operate in the gaming mode or the standard mode. The host system 105-*d* and the memory system 110-*d* may regularly switch between the two modes to reduce latency for gaming applications while also prioritizing error-checking for non-gaming applications.

Figure 6:
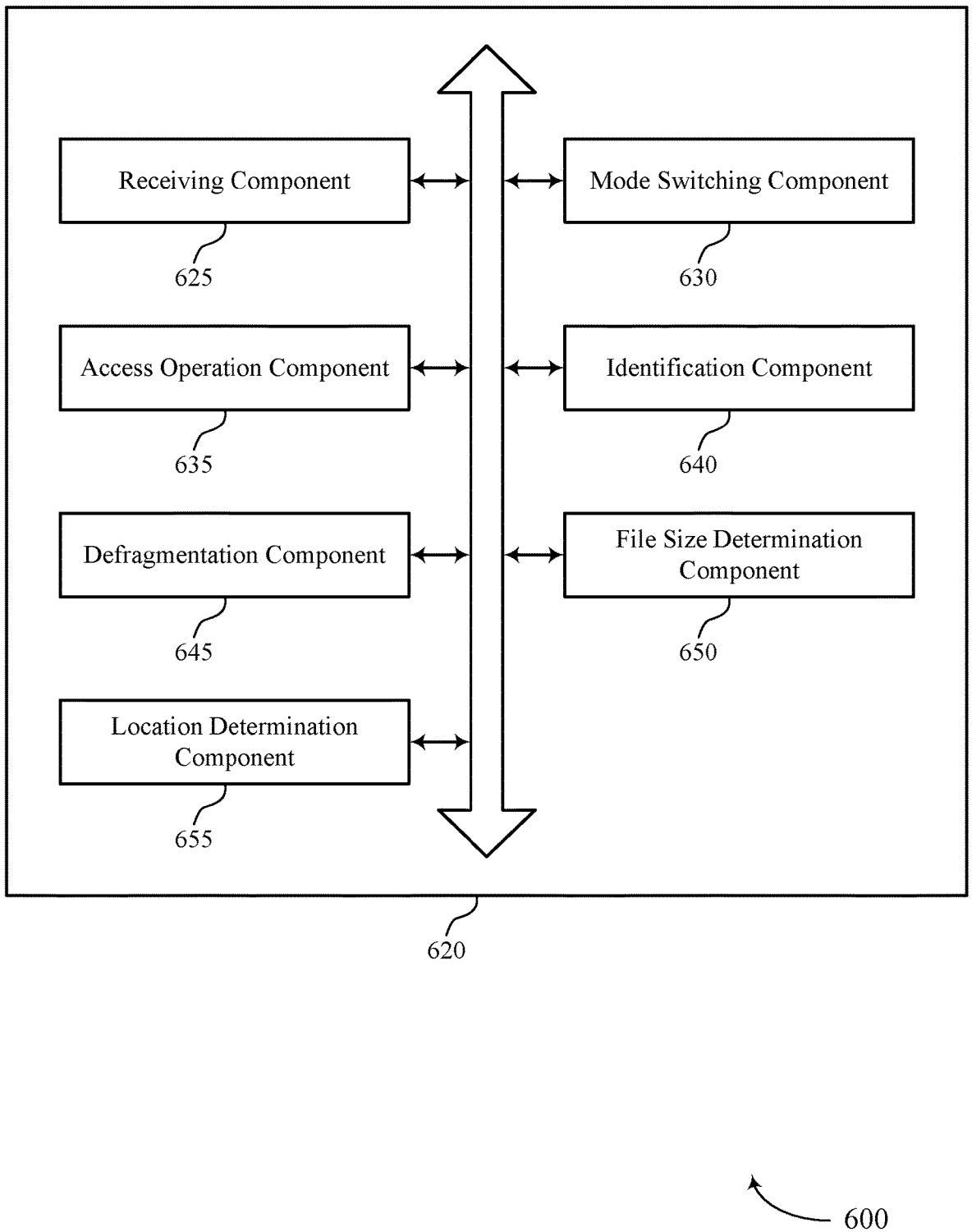
FIG. 6 shows a block diagram of a memory system that supports techniques to improve latency for gaming applications in accordance with examples as disclosed herein.

FIG. 6 shows a block diagram 600 of a memory system 620 that supports techniques to improve latency for gaming applications in accordance with examples as disclosed herein. The memory system 620 may be an example of aspects of a memory system as described with reference to FIGS. 1 through 5. The memory system 620, or various components thereof, may be an example of means for performing various aspects of techniques to improve latency for gaming applications as described herein. For example, the memory system 620 may include a receiving component 625, a mode switching component 630, an access operation component 635, an identification component 640, a defragmentation component 645, a file size determination component 650, a location determination component 655, or any combination thereof. Each of these components may communicate, directly or indirectly, with one another (e.g., via one or more buses).

The receiving component 625 may be configured as or otherwise support a means for receiving, from a host system, an access command to access a first logical address at a memory system. The mode switching component 630 may be configured as or otherwise support a means for switching from a second mode of operation to a first mode of operation based at least in part on determining that the first logical address is located at a first portion of the memory system allocated for the first mode of operation associated with a gaming application. The access operation component 635 may be configured as or otherwise support a means for performing an access operation according to the first mode of operation.

In some examples, the access command includes an indication to operate in the first mode of operation, and the switching from the second mode of operation to the first mode of operation is based at least in part on the indication.

In some examples, the identification component 640 may be configured as or otherwise support a means for performing a pattern recognition algorithm to identify that an application being performed by the host system is the gaming application, where the switching from the second mode of operation to the first mode of operation is based at least in part on a result of performing the pattern recognition algorithm.

In some examples, the access operation component 635 may be configured as or otherwise support a means for writing, at the first portion of the memory system, information associated with the access command, where the access command includes a write command, where the information is written at a quantity of sequential logical addresses starting at the first logical address.

In some examples, the receiving component 625 may be configured as or otherwise support a means for receiving, from the host system, an indication of a file size associated with the gaming application. In some examples, the defragmentation component 645 may be configured as or otherwise support a means for performing, based at least in part on receiving the indication, a defragmentation operation at the first portion of the memory system.

In some examples, the file size determination component 650 may be configured as or otherwise support a means for determining, based at least in part on a history of access commands received from the host system, a file size associated with the gaming application. In some examples, the defragmentation component 645 may be configured as or otherwise support a means for performing, based at least in part on the determining the file size, a defragmentation operation at the first portion of the memory system.

In some examples, the defragmentation component 645 may be configured as or otherwise support a means for performing, at periodic intervals, one or more defragmentation operations at the memory system to increase a sequentiality of space available in the first portion of the memory system.

In some examples, an order of defragmentation operations is based at least in part on the first mode of operation.

In some examples, the first mode of operation is associated with a first duration for performing the access command and a quick cell placement. In some examples, the second mode of operation is associated a second duration for performing the access command greater than the first duration, the second mode of operation includes performing an accuracy check on a state stored by the access command.

In some examples, the access command is associated with transferring files associated with the gaming application from a remote server to a non-volatile memory device of the memory system.

In some examples, the access command is associated with transferring files associated with the gaming application from a non-volatile memory device of the memory system to a volatile device of the memory system.

In some examples, the access command is associated with transferring files associated with the gaming application from a volatile memory device of the memory system to a non-volatile device of the memory system.

In some examples, the receiving component 625 may be configured as or otherwise support a means for receiving, from the host system, a second access command to access a second logical address at the memory system. In some examples, the location determination component 655 may be configured as or otherwise support a means for determining, based at least in part on receiving the second access command, that the second logical address is located at a second portion of the memory system. In some examples, the mode switching component 630 may be configured as or otherwise support a means for switching from the first mode of operation to the second mode of operation. In some examples, the access operation component 635 may be configured as or otherwise support a means for performing the access operation according to the second mode of operation.

Figure 7:
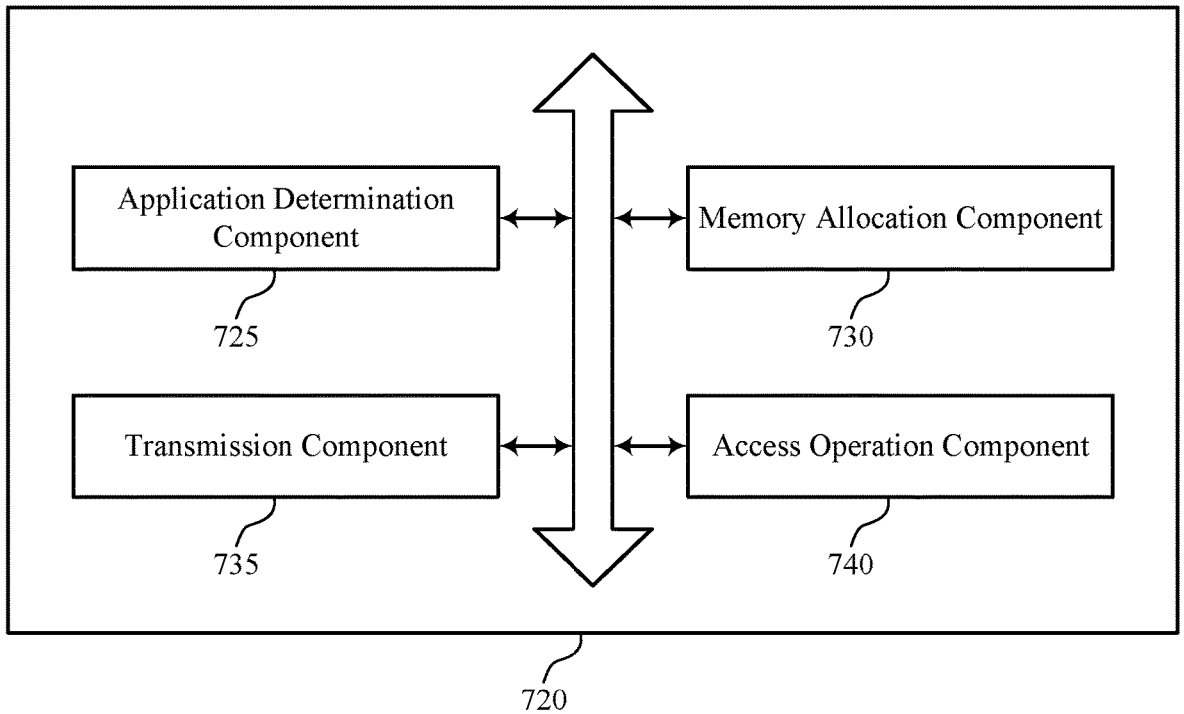
FIG. 7 shows a block diagram of a host system that supports techniques to improve latency for gaming applications in accordance with examples as disclosed herein.

FIG. 7 shows a block diagram 700 of a host system 720 that supports techniques to improve latency for gaming applications in accordance with examples as disclosed herein. The host system 720 may be an example of aspects of a host system as described with reference to FIGS. 1 through 5. The host system 720, or various components thereof, may be an example of means for performing various aspects of techniques to improve latency for gaming applications as described herein. For example, the host system 720 may include an application determination component 725, a memory allocation component 730, a transmission component 735, an access operation component 740, or any combination thereof. Each of these components may communicate, directly or indirectly, with one another (e.g., via one or more buses).

The application determination component 725 may be configured as or otherwise support a means for determining a type of an application executed by a host system, the type of the application associated with a first mode of operation at a memory system. The memory allocation component 730 may be configured as or otherwise support a means for allocating a first portion of the memory system to operate in the first mode of operation based at least in part on determining the type of the application. The transmission component 735 may be configured as or otherwise support a means for transmitting an access command to the memory system for the application executed by the host system based at least in part on allocating the first portion; where the access command includes an indication of the first mode or an indication of a first logical address in the first portion.

In some examples, the access command includes a read command or a write command.

In some examples, the access command further includes an indication to perform a defragmentation operation at the first portion of the memory system.

In some examples, the access command further includes an indication of a file size associated with the type of application based at least in part on the determining.

In some examples, the first mode of operation is associated with a first duration for performing the access command and a quick cell placement. In some examples, the second mode of operation is associated a second duration for performing the access command greater than the first duration, the second mode of operation includes performing an accuracy check on a state stored by the access command.

In some examples, the application determination component 725 may be configured as or otherwise support a means for determining a second type of an application executed by the host system, the second type of the application associated with a second mode of operation at the memory system, where the second mode of operation is associated with a second speed that is slower than a first speed associated with the first mode of operation, and where the second mode of operation includes performing an accuracy check after each write operation. In some examples, the transmission component 735 may be configured as or otherwise support a means for transmitting a second access command to the memory system for the second type of the application executed by the host system, where the second access command includes an indication of the second mode of operation.

Figure 8:
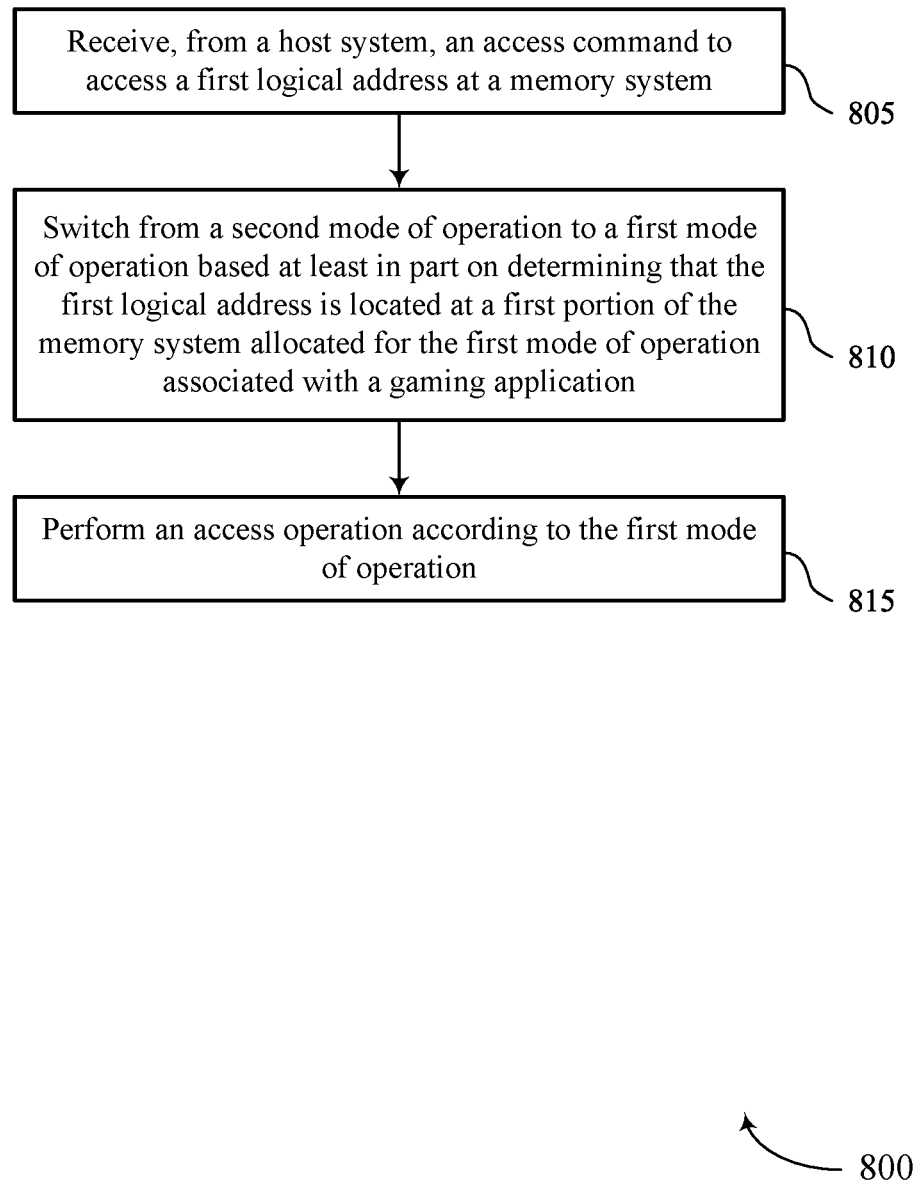
FIGS. 8 and 9 show flowcharts illustrating a method or methods that support techniques to improve latency for gaming applications in accordance with examples as disclosed herein.

FIG. 8 shows a flowchart illustrating a method 800 that supports techniques to improve latency for gaming applications in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally or alternatively, the memory system may perform aspects of the described functions using special-purpose hardware.

At 805, the method may include receiving, from a host system, an access command to access a first logical address at a memory system. The operations of 805 may be performed in accordance with examples as disclosed herein. In some examples, aspects of the operations of 805 may be performed by a receiving component 625 as described with reference to FIG. 6.

At 810, the method may include switching from a second mode of operation to a first mode of operation based at least in part on determining that the first logical address is located at a first portion of the memory system allocated for the first mode of operation associated with a gaming application. The operations of 810 may be performed in accordance with examples as disclosed herein. In some examples, aspects of the operations of 810 may be performed by a mode switching component 630 as described with reference to FIG. 6.

At 815, the method may include performing an access operation according to the first mode of operation. The operations of 815 may be performed in accordance with examples as disclosed herein. In some examples, aspects of the operations of 815 may be performed by an access operation component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, from a host system, an access command to access a first logical address at a memory system; switching from a second mode of operation to a first mode of operation based at least in part on determining that the first logical address is located at a first portion of the memory system allocated for the first mode of operation associated with a gaming application; and performing an access operation according to the first mode of operation.

Aspect 2: The method, apparatus, or non-transitory computer-readable medium of aspect 1 where the access command includes an indication to operate in the first mode of operation, and the switching from the second mode of operation to the first mode of operation is based at least in part on the indication.

Aspect 3: The method, apparatus, or non-transitory computer-readable medium of any of aspects 1 through 2, further including operations, features, circuitry, logic, means, or instructions, or any combination thereof for performing a pattern recognition algorithm to identify that an application being performed by the host system is the gaming application, where the switching from the second mode of operation to the first mode of operation is based at least in part on a result of performing the pattern recognition algorithm.

Aspect 4: The method, apparatus, or non-transitory computer-readable medium of any of aspects 1 through 3, further including operations, features, circuitry, logic, means, or instructions, or any combination thereof for writing, at the first portion of the memory system, information associated with the access command, where the access command includes a write command, where the information is written at a quantity of sequential logical addresses starting at the first logical address.

Aspect 5: The method, apparatus, or non-transitory computer-readable medium of any of aspects 1 through 4, further including operations, features, circuitry, logic, means, or instructions, or any combination thereof for receiving, from the host system, an indication of a file size associated with the gaming application and performing, based at least in part on receiving the indication, a defragmentation operation at the first portion of the memory system.

Aspect 6: The method, apparatus, or non-transitory computer-readable medium of any of aspects 1 through 5, further including operations, features, circuitry, logic, means, or instructions, or any combination thereof for determining, based at least in part on a history of access commands received from the host system, a file size associated with the gaming application and performing, based at least in part on the determining the file size, a defragmentation operation at the first portion of the memory system.

Aspect 7: The method, apparatus, or non-transitory computer-readable medium of any of aspects 1 through 6, further including operations, features, circuitry, logic, means, or instructions, or any combination thereof for performing, at periodic intervals, one or more defragmentation operations at the memory system to increase a sequentiality of space available in the first portion of the memory system.

Aspect 8: The method, apparatus, or non-transitory computer-readable medium of aspect 7 where an order of defragmentation operations is based at least in part on the first mode of operation.

Aspect 9: The method, apparatus, or non-transitory computer-readable medium of any of aspects 1 through 8 where the first mode of operation is associated with a first duration for performing the access command and a quick cell placement and the second mode of operation is associated a second duration for performing the access command greater than the first duration, the second mode of operation includes performing an accuracy check on a state stored by the access command.

Aspect 10: The method, apparatus, or non-transitory computer-readable medium of any of aspects 1 through 9 where the access command is associated with transferring files associated with the gaming application from a remote server to a non-volatile memory device of the memory system.

Aspect 11: The method, apparatus, or non-transitory computer-readable medium of any of aspects 1 through 10 where the access command is associated with transferring files associated with the gaming application from a non-volatile memory device of the memory system to a volatile device of the memory system.

Aspect 12: The method, apparatus, or non-transitory computer-readable medium of any of aspects 1 through 11 where the access command is associated with transferring files associated with the gaming application from a volatile memory device of the memory system to a non-volatile device of the memory system.

Aspect 13: The method, apparatus, or non-transitory computer-readable medium of any of aspects 1 through 12, further including operations, features, circuitry, logic, means, or instructions, or any combination thereof for receiving, from the host system, a second access command to access a second logical address at the memory system; determining, based at least in part on receiving the second access command, that the second logical address is located at a second portion of the memory system; switching from the first mode of operation to the second mode of operation; and performing the access operation according to the second mode of operation.

Figure 9:
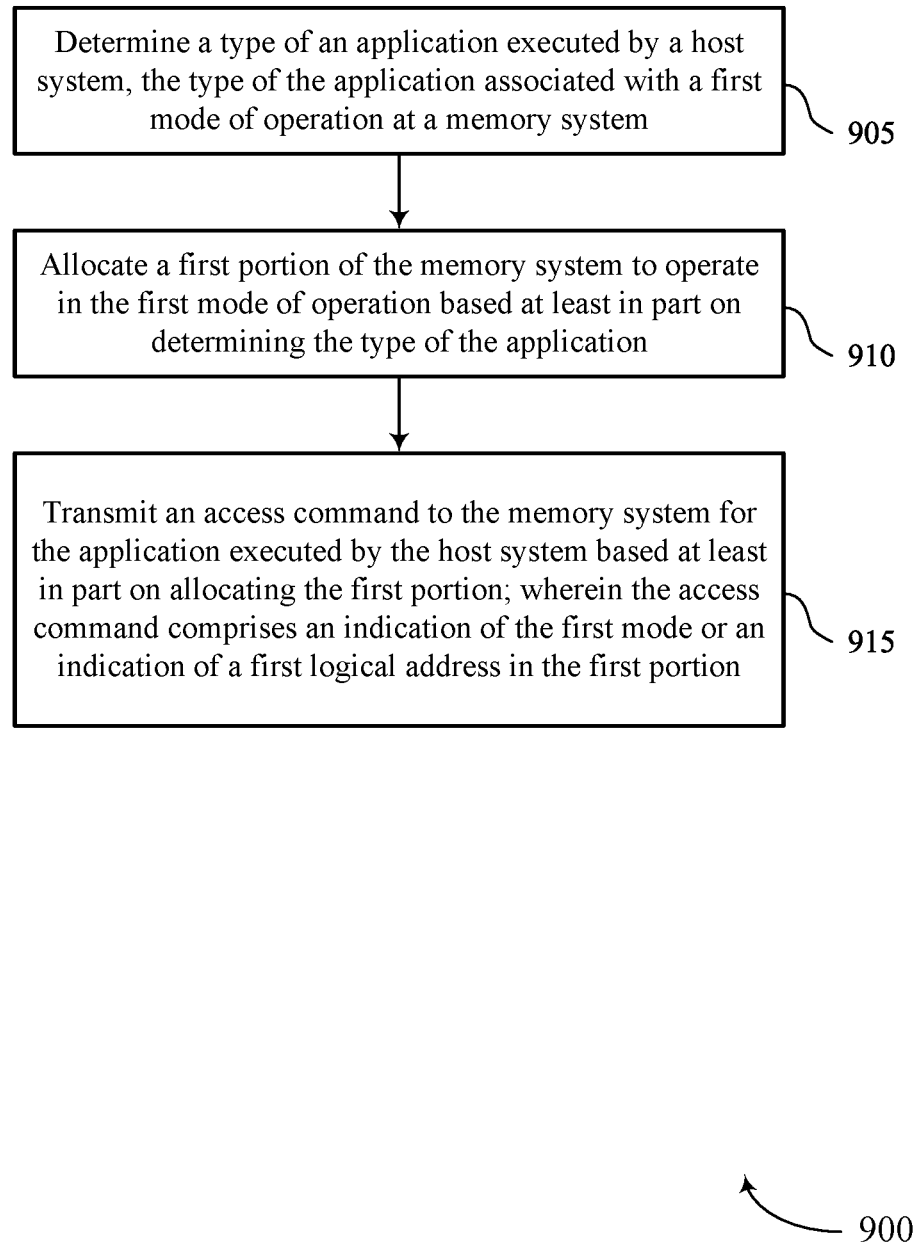

FIG. 9 shows a flowchart illustrating a method 900 that supports techniques to improve latency for gaming applications in accordance with examples as disclosed herein. The operations of method 900 may be implemented by a host system or its components as described herein. For example, the operations of method 900 may be performed by a host system as described with reference to FIGS. 1 through 5 and 7. In some examples, a host system may execute a set of instructions to control the functional elements of the device to perform the described functions. Additionally or alternatively, the host system may perform aspects of the described functions using special-purpose hardware.

At 905, the method may include determining a type of an application executed by a host system, the type of the application associated with a first mode of operation at a memory system. The operations of 905 may be performed in accordance with examples as disclosed herein. In some examples, aspects of the operations of 905 may be performed by an application determination component 725 as described with reference to FIG. 7.

At 910, the method may include allocating a first portion of the memory system to operate in the first mode of operation based at least in part on determining the type of the application. The operations of 910 may be performed in accordance with examples as disclosed herein. In some examples, aspects of the operations of 910 may be performed by a memory allocation component 730 as described with reference to FIG. 7.

At 915, the method may include transmitting an access command to the memory system for the application executed by the host system based at least in part on allocating the first portion; where the access command includes an indication of the first mode or an indication of a first logical address in the first portion. The operations of 915 may be performed in accordance with examples as disclosed herein. In some examples, aspects of the operations of 915 may be performed by a transmission component 735 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for determining a type of an application executed by a host system, the type of the application associated with a first mode of operation at a memory system; allocating a first portion of the memory system to operate in the first mode of operation based at least in part on determining the type of the application; and transmitting an access command to the memory system for the application executed by the host system based at least in part on allocating the first portion; where the access command includes an indication of the first mode or an indication of a first logical address in the first portion.

Aspect 15: The method, apparatus, or non-transitory computer-readable medium of aspect 14 where the access command includes a read command or a write command.

Aspect 16: The method, apparatus, or non-transitory computer-readable medium of any of aspects 14 through 15 where the access command further includes an indication to perform a defragmentation operation at the first portion of the memory system.

Aspect 17: The method, apparatus, or non-transitory computer-readable medium of any of aspects 14 through 16 where the access command further includes an indication of a file size associated with the type of application based at least in part on the determining.

Aspect 18: The method, apparatus, or non-transitory computer-readable medium of any of aspects 14 through 17 where the first mode of operation is associated with a first duration for performing the access command and a quick cell placement and a second mode of operation at the memory system is associated a second duration for performing the access command greater than the first duration, the second mode of operation includes performing an accuracy check on a state stored by the access command.

Aspect 19: The method, apparatus, or non-transitory computer-readable medium of aspect 18, further including operations, features, circuitry, logic, means, or instructions, or any combination thereof for determining a second type of an application executed by the host system, the second type of the application associated with the second mode of operation at the memory system, where the second mode of operation is associated with a second speed that is slower than a first speed associated with the first mode of operation, and where the second mode of operation includes performing an accuracy check after each write operation and transmitting a second access command to the memory system for the second type of the application executed by the host system, where the second access command includes an indication of the second mode of operation.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The terms "if" "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    receiving, by a memory system from a host system, an access command to access a logical address at DB the memory system, wherein the access command is associated with transferring files between the memory system and a remote server different than the host system;

performing, by the memory system, a pattern recognition algorithm to determine whether the access command is associated with a gaming application being performed by the host system;

switching, by the memory system, from a second mode of operation to a first mode of operation based at least in part on determining that the access command is associated with DB the gaming application; and performing, by the memory system, an access operation according to the first mode of operation.

2. The method of claim 1, wherein the access command comprises an indication to operate in the first mode of operation, and the switching from the second mode of operation to the first mode of operation is based at least in part on the indication.

3. The method of claim 1, further comprising:
writing, by the memory system at a first portion of the memory system, information associated with the access command, wherein the access command comprises a write command, wherein the information is written at a quantity of sequential logical addresses starting at the first logical address.

4. The method of claim 1, further comprising:
receiving, by the memory system from the host system, an indication of a file size associated with the gaming application; and
performing, by the memory system, based at least in part on receiving the indication, a defragmentation operation at a first portion of the memory system.

5. The method of claim 1, further comprising:
determining, by the memory system, based at least in part on a history of access commands received from the host system, a file size associated with the gaming application; and
performing, by the memory system, based at least in part on the determining the file size, a defragmentation operation at a first portion of the memory system.

6. The method of claim 1, further comprising:
performing, by the memory system at periodic intervals, one or more defragmentation operations to increase a sequentiality of space available in a first portion of the memory system.

7. The method of claim 6, wherein an order of defragmentation operations is based at least in part on the first mode of operation.

8. The method of claim 1, wherein:
the first mode of operation is associated with a first duration for performing the access command by the memory system and a quick cell placement; and
the second mode of operation is associated with a second duration for performing the access command by the memory system greater than the first duration, wherein the second mode of operation comprises performing, by the memory system, an accuracy check on a state stored by the access command.

9. The method of claim 1, wherein the access command is associated with transferring the files from the remote server to a non-volatile memory device of the memory system.

10. The method of claim 1, further comprising:
receiving, by the memory system from the host system, a second access command to access a second logical address at the memory system;
determining, based at least in part on receiving the second access command, that the second logical address is located at a portion of the memory system;
switching from the first mode of operation to the second mode of operation; and
performing the access operation according to the second mode of operation.

11. An apparatus, comprising:
a controller associated with a memory device, wherein the controller is configured to cause the apparatus to:
receive, by the memory system from a host system, an access command to access a logical address at the memory system, wherein the access command is associated with transferring files between the memory system and a remote server different than the host system;
perform, by the memory system, a pattern recognition algorithm to determine whether the access command is associated with a gaming application being performed by the host system;
switch, by the memory system, from a second mode of operation to a first mode of operation based at least in part on determining that the access command is associated with DB the gaming application; and
perform, by the memory system, an access operation according to the first mode of operation.

12. The apparatus of claim 11, wherein the access command comprises an indication to operate in the first mode of operation, and the switching from the second mode of operation to the first mode of operation is based at least in part on the indication.

13. The apparatus of claim 11, wherein the controller is further configured to cause the apparatus to:
write, by the memory system at a first portion of the memory system, information associated with the access command, wherein the access command comprises a write command, wherein the information is written at a quantity of sequential logical addresses starting at the logical address.

14. The apparatus of claim 11, wherein the controller is further configured to cause the apparatus to:
receive, by the memory system from the host system, an indication of a file size associated with the gaming application; and
perform, by the memory system based at least in part on receiving the indication, a defragmentation operation at a first portion of the memory system.

15. The apparatus of claim 11, wherein the controller is further configured to cause the apparatus to:
determine, by the memory system based at least in part on a history of access commands received from the host system, a file size associated with the gaming application; and
perform, by the memory system based at least in part on the determining the file size, a defragmentation operation at a first portion of the memory system.

* * * * *